`United States Patent` [19]

Schwarz

[11] 4,446,208

[45] May 1, 1984

[54] EXPANDABLE POLYSTYRENE COMPOSITION AND PROCESS

[75] Inventor: Richard A. Schwarz, Big Spring, Tex.

[73] Assignee: Cosden Technology, Inc., Dallas, Tex.

[21] Appl. No.: 516,070

[22] Filed: Jul. 22, 1983

Related U.S. Application Data

[62] Division of Ser. No. 489,973, Apr. 29, 1983.

[51] Int. Cl.³ .............................. B32B 5/16; C08J 9/22
[52] U.S. Cl. ....................................... 428/407; 521/57; 521/93
[58] Field of Search ........................... 521/57; 428/407

[56] References Cited

U.S. PATENT DOCUMENTS

3,560,414  2/1971  Miskel, Jr. et al. .................. 521/57

*Primary Examiner*—Morton Foelak
*Attorney, Agent, or Firm*—Russell H. Schlattman; M. Norwood Cheairs

[57] ABSTRACT

A composition and process for reducing the adhesion of expandable polystyrene beads impregnated with a blowing agent such as pentane. The composition comprises effective amounts of magnesium stearate and zinc stearate respectively. The composition is added to the polystyrene in an apparatus such as a tumble blender prior to pre-expansion of the impregnated polystyrene beads.

2 Claims, No Drawings

EXPANDABLE POLYSTYRENE COMPOSITION AND PROCESS

CROSS REFERENCE TO RELATED APPLICATIONS

This application is a divisional of a prior copending application, Ser. No. 489,973, filed April 29, 1983 by Richard A. Schwarz for "Expandable Polystyrene Composition and Process".

BACKGROUND OF THE INVENTION

The present invention relates to a composition and a process for reducing the adhesion of expandable polystyrene beads to one another. The production of expandable polystyrene (EPS) involves suspension of polystyrene beads in a stirred reactor. A blowing agent such as pentane, is introduced into the reactor for impregnation of the polystyrene beads. After a suitable time for impregnation, the polystyrene beads are removed from the reactor, dried and partially expanded to form a pre-puff by subjecting the beads to steam in an unconfined space. After sufficient aging, the pre-puffs are then placed in the desired mold and subjected to steam for expansion of the pre-puff into the final desired form within the confines of the mold. It has been found, however, that polystyrene beads impregnated with a blowing agent have a tendency to adhere to one another during pre-expansion, a characteristic known as "clumping". Clumping, most prevalent in the pre-expander where the pre-puffs are formed from beads, causes the pre-expander to become clogged.

Common anti-clumping agents include silicon dioxide, calcium silicate, magnesium carbonate, and zinc stearate/calcium silicate.

It would be desirable, therefore, to obtain a composition and a process which not only reduces or eliminates the clumping tendencies of expandable polystyrene, but which also is compatible with the expanded polystyrene product.

SUMMARY OF THE INVENTION

It is therefore an object of the present invention to provide a composition and a process for reducing adhesion of polystyrene beads.

It is another object of the present invention to provide a composition and a process for reducing the adhesion of expandable polystyrene beads impregnated with a blowing agent.

In accordance with the above objects, there is provided in the present invention a composition for reducing the adhesion of expandable polystyrene beads. The composition comprises effective amounts of magnesium stearate and zinc stearate respectively. The invention also includes a process for reducing the adhesion of expandable polystyrene beads. The process comprises subjecting the particles to an anti-adhesion composition comprising effective amounts of magnesium stearate and zinc stearate respectively.

DETAILED DESCRIPTION OF THE PREFERRED EMBODIMENTS

The present invention comprises a composition and process for reducing the adhesion of polystyrene beads to one another, particularly during pre-expansion of those beads. By polystyrene beads it is meant to include those forms and shapes in which expandable polystyrene is normally found during pre-expansion such as beads, pre-puffs, and the like. The anti-adhesion composition comprises effective amounts of magnesium stearate and zinc stearate respectively.

The composition of the present invention is added to the polystyrene beads prior to their partial expansion in a pre-expander. Normally since most expandable polystyrene beads are produced from a mass suspension unit, the beads once removed from the suspension reactor are dried and then treated with the zinc stearate and magnesium stearate composition. This composition is particularly useful because it is available in a powdered form. The composition works at the surface of the polystyrene to reduce the surface tension and adhesive qualities of the polystyrene beads. Therefore, any apparatus which provides adequate dispersion of the composition over the surface of the beads is an effective means for blending the composition with the polystyrene. Examples of such apparatus include tumble blenders and ribbon blenders.

It has been found that an effective amount of magnesium stearate is from about 50 grams to about 400 grams per 1000 pounds of expandable polystyrene beads. An effective amount of zinc stearate is from about 50 grams to about 500 grams per 1000 pounds of expandable polystyrene beads. An effective weight ratio of magnesium stearate to zinc stearate is from about 3 to about 0.5. The preferred amount of magnesium stearate is from about 100 grams to about 300 grams per 1000 pounds of expandable polystyrene beads; the preferred amount of zinc stearate is from about 50 grams to about 200 grams per 1000 pounds of expandable polystyrene beads. The preferred weight ratio of magnesium stearate to zinc stearate is about 2.

The ingredients in the anti-adhesion composition need not be added in any particular order. The magnesium stearate and zinc stearate may be combined and added as an integral composition to the polystyrene; or effective amounts of magnesium stearate and zinc stearate may be added separately as for example, into the tumble blender in any particular order desired.

The composition of the present invention is an effective anti-adhesive when the polystyrene is impregnated by any hydrocarbon blowing agent. The composition is particularly effective in reducing adhesiveness of polystyrene impregnated with pentane.

The invention is further described by referring to the following examples which are not intended to limit the scope of the invention but merely illustrate the details and manner of practicing the invention.

EXAMPLE 1

5 grams of magnesium stearate and 2.5 grams of zinc stearate were added to 25 pounds of polystyrene beads in a Henschel slow speed blender at ambient temperature and pressure. The polystyrene beads had been impregnated with pentane and other additives such as flame retardants and suspension enhancers. After 20 seconds of agitation, the beads were removed and transported to a pre-expander unit. The beads were expanded in the pre-expander by the addition of steam at approximately 220° F. for 180 seconds and the resulting partially expanded beads (pre-puffs) were then tested for clumping as follows: 100 grams of the pre-puffs were dried and passed through a screen filter to separate out any clumps. Two screen sizes were used, a number 3 orifice size and a number 4 orifice size. The clumps that were separated out were then weighed. The agglomeration of the pre-puffs in the pre-expander were based on visual references. In a further test, the polystyrene pre-puffs were aged for approximately 8 hours, then placed in a block mold and subjected to steam injection at approximately 235° F. for approximately 10 to 15 seconds, reaching a mold pressure of either 12 psi or 15 psi. The molded article was allowed to cool, removed from the block and then subjected to a fusion test wherein the molded article was torn into pieces to obtain a comparison of the percentage of beads that were torn through versus the percentage of beads that tore around the periphery thereof. The results of 8 runs using various quantities of magnesium stearate and zinc stearate are reflected in Table I. In addition, for runs 5 through 8, a tumble blender was utilized instead of the Henschel blender, for a 12 minute tumble period.

TABLE I

| Run | Additives (gms/1000# EPS) Magnesium/Zinc Stearate | Microcel E | Clumping (gms of clumps/100 gms prepuffs) #3/#4 Orifice | Fusion 12/15 psig | Agglomeration S = Slight M = Medium H = Heavy |
|---|---|---|---|---|---|
| 1 | 0/0 | 0 | 26.7/27.4 | — | S-M |
| 2 | 0/0 | 600 | 3.18/3.26 | 15/45 | S-M |
| 3 | 200/100 | 0 | 0.19/0.16 | 20/35 | H |
| 4 | 200/100 | 0 | 0.46/0.41 | 35/40 | M-H |
| 5 | 0/0 | 0 | 28.5/22.2 | 15/35 | H |
| 6 | 0/0 | 600 | 1.67/1.41 | 30/50 | M |
| 7 | 200/100 | 0 | 0.06/0.08 | 40/55 | M-H |
| 8 | 400/0 | 0 | 0.33/0.74 | 50/45 | S |

Runs 1-4 used a Henschel 20 sec. slow speed blender
Runs 5-8 used a 12 minute tumble blender The above data indicates that the composition of the present invention significantly reduces the clumping of the pre-expanded polystyrene compared to the situation where no anti-clumping composition is added, or where a known anti-clumping composition is added, i.e., Microcel E, a trademark of Johns-Manville Corporation, comprising calcium silicate. In addition, the polystyrene subject to the composition of the present invention showed acceptable fusion characteristics, i.e., the degree of fusion was directly controllable over a broad range by utilization of proper mold temperatures and pressure conditions.

Although a preferred specific embodiment of the present invention has been described in the detailed description above, this description is not intended to limit the invention to the particular form or embodiments disclosed herein since it is to be recognized as illustrative rather than limitative, and it will be obvious to those skilled in the art that the invention is not so limited. Thus, the invention is declared to cover all changes and modifications of the specific examples of the invention herein disclosed for purposes of illustration which do not constitute departures from the spirit and scope of the invention.

The embodiments of the invention in which an exclusive privilege or property is claimed is defined as follows:

1. Expandable polystyrene beads exhibiting reduced adhesion to one another comprising expandable polystyrene beads containing a volatile blowing agent, said beads being coated with an anti-adhesion composition comprising effective amounts of magnesium stearate and zinc stearate respectively, wherein, (a) the effective amount of magnesium stearate is from about 50 gms. to about 40 gms. per 1,000 lbs. of expandable polystyrene beads; and (b) the effective amount of zinc stearate is from about 50 gms. to about 500 gms. per 1,000 lbs. of expandable polystyrene beads.

2. The composition of claim 1 wherein the blowing agent is pentane.

* * * * *